(12) United States Patent
Wojzischke

(10) Patent No.: US 10,331,271 B2
(45) Date of Patent: Jun. 25, 2019

(54) DISPLAYING AND OPERATING DEVICE AND METHOD FOR CONTROLLING A DISPLAYING AND OPERATING DEVICE

(71) Applicant: VOLKSWAGEN AG, Wolfsburg (DE)

(72) Inventor: Christoph Wojzischke, Braunschweig (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 14/418,935

(22) PCT Filed: Jul. 23, 2013

(86) PCT No.: PCT/EP2013/065467
§ 371 (c)(1),
(2) Date: Jan. 31, 2015

(87) PCT Pub. No.: WO2014/019884
PCT Pub. Date: Feb. 6, 2014

(65) Prior Publication Data
US 2015/0193086 A1  Jul. 9, 2015

(30) Foreign Application Priority Data

Aug. 1, 2012 (DE) .................. 10 2012 015 255

(51) Int. Cl.
*G06F 3/042* (2006.01)
*B60K 37/06* (2006.01)
*G01J 5/00* (2006.01)

(52) U.S. Cl.
CPC ............ *G06F 3/0421* (2013.01); *B60K 37/06* (2013.01); *B60K 2350/104* (2013.01);
(Continued)

(58) Field of Classification Search
CPC ......... G06F 3/0421; G06F 2203/04108; G06F 3/033; G06F 3/02; G06F 3/00;
(Continued)

(56) References Cited

U.S. PATENT DOCUMENTS

| 5,084,696 A | 1/1992 | Guscott et al. |
| 6,288,395 B1 | 9/2001 | Kuhnly et al. |

(Continued)

FOREIGN PATENT DOCUMENTS

| CN | 101405177 A | 4/2009 |
| CN | 102159420 A | 8/2011 |

(Continued)

OTHER PUBLICATIONS

Search Report for German Patent Application No. 10 2012 015 255.8; dated Feb. 22, 2013.

(Continued)

*Primary Examiner* — Nicholas J Lee
*Assistant Examiner* — Gerald L Oliver
(74) *Attorney, Agent, or Firm* — Barnes & Thornburg LLP

(57) ABSTRACT

A displaying and operating device having a display unit and at least one proximity sensor, wherein a penetration of an object into at least one monitoring space can be detected by the proximity sensor, wherein at least one representation on the display unit is changed as a function of a penetrating object, wherein the displaying and operating device has a unit wherein a chronological sequence of receive signals from the proximity sensor is evaluated by the unit, wherein a constant receive signal is detected and stored within a predetermined time interval and, for subsequent operating, is ignored as a static receive signal of the display unit, wherein a change in the representation is carried out only if a subsequent receive signal exceeds the static receive signal (Continued)

by a predetermined value. Also disclosed is a method for operating a displaying and operating device.

14 Claims, 4 Drawing Sheets

(52) U.S. Cl.
CPC ......... *B60K 2350/1012* (2013.01); *G01J 5/00* (2013.01); *G06F 2203/04108* (2013.01)

(58) Field of Classification Search
CPC .......... G06F 3/041; G06F 3/042; G06F 3/044; G06F 3/0416; G06F 17/00; B60K 37/06; B60K 2350/104; B60K 2350/1012; B60K 26/00; G09G 5/00; G09G 3/02; G09G 1/16; G09G 5/08; H03M 1/12; H01L 31/00; G02B 27/10; G02B 27/14; F16H 59/00; F16H 61/00; F16H 63/00
See application file for complete search history.

(56) References Cited

U.S. PATENT DOCUMENTS

| | | | |
|---|---|---|---|
| 6,326,622 B1 | 12/2001 | Duve | |
| 9,671,894 B2* | 6/2017 | Schenkewitz | G06F 3/0416 |
| 2003/0128190 A1* | 7/2003 | Wilbrink | G06F 1/1626 |
| | | | 345/169 |
| 2003/0156332 A1* | 8/2003 | Seino | G06F 3/0421 |
| | | | 359/627 |
| 2004/0140959 A1 | 7/2004 | Matsumura et al. | |
| 2006/0290921 A1* | 12/2006 | Hotelling | G01S 17/026 |
| | | | 356/152.2 |
| 2008/0012835 A1* | 1/2008 | Rimon | G06F 3/038 |
| | | | 345/173 |
| 2008/0106523 A1* | 5/2008 | Conrad | G06F 3/0486 |
| | | | 345/173 |
| 2009/0121889 A1 | 5/2009 | Lin et al. | |
| 2009/0327977 A1* | 12/2009 | Bachfischer | B60K 35/00 |
| | | | 715/863 |
| 2011/0080490 A1* | 4/2011 | Clarkson | G06F 3/017 |
| | | | 348/222.1 |
| 2012/0069027 A1* | 3/2012 | Yamazaki | G06F 3/018 |
| | | | 345/472.3 |
| 2012/0287084 A1* | 11/2012 | Cheng | G06F 3/0421 |
| | | | 345/175 |
| 2012/0312956 A1* | 12/2012 | Chang | G06F 3/017 |
| | | | 250/201.1 |
| 2013/0271204 A1* | 10/2013 | Salter | H03K 17/94 |
| | | | 327/517 |
| 2013/0286783 A1* | 10/2013 | Sussman | G01S 3/8083 |
| | | | 367/93 |

FOREIGN PATENT DOCUMENTS

| | | |
|---|---|---|
| DE | 102006037156 A1 | 9/2007 |
| DE | 102007005027 A1 | 1/2008 |
| DE | 102009036369 A1 | 2/2011 |
| EP | 1932725 A1 | 6/2008 |
| JP | 2002148354 A | 5/2002 |
| JP | 2009216888 A | 9/2009 |
| KR | 1020100097682 A | 9/2010 |
| WO | 2007107368 A1 | 9/2007 |

OTHER PUBLICATIONS

Search Report for International Patent Application No. PCT/EP2013/065467; dated Dec. 13, 2013.
Korean Office Action in corresponding application 10-2015-7005348, dated Jun. 20, 2016.
Chinese Office Action in corresponding application 201380040761.3, dated Jun. 26, 2016.
Office Action for Korean Patent Application No. 10-2015-7005348; dated Dec. 28, 2016.

\* cited by examiner

DISPLAYING AND OPERATING DEVICE AND METHOD FOR CONTROLLING A DISPLAYING AND OPERATING DEVICE

PRIORITY CLAIM

This patent application is a U.S. National Phase of International Patent Application No. PCT/EP2013/065467, filed 23 Jul. 2013, which claims priority to German Patent Application No. 10 2012 015 255.8, filed 1 Aug. 2012, the disclosures of which are incorporated herein by reference in their entirety.

SUMMARY

Illustrative embodiments relate to a displaying and operating device and to a method for controlling a displaying and operating device.

The disclosed embodiments address the technical problem of providing a displaying and operating device of the generic type and a method for controlling such a displaying and operating device in which malfunctions are reduced.

BRIEF DESCRIPTION OF THE DRAWINGS

The invention is explained in greater detail below on the basis of at least one disclosed embodiment. In the figures.

DETAILED DESCRIPTION OF THE DISCLOSED EMBODIMENTS

Figure 1:
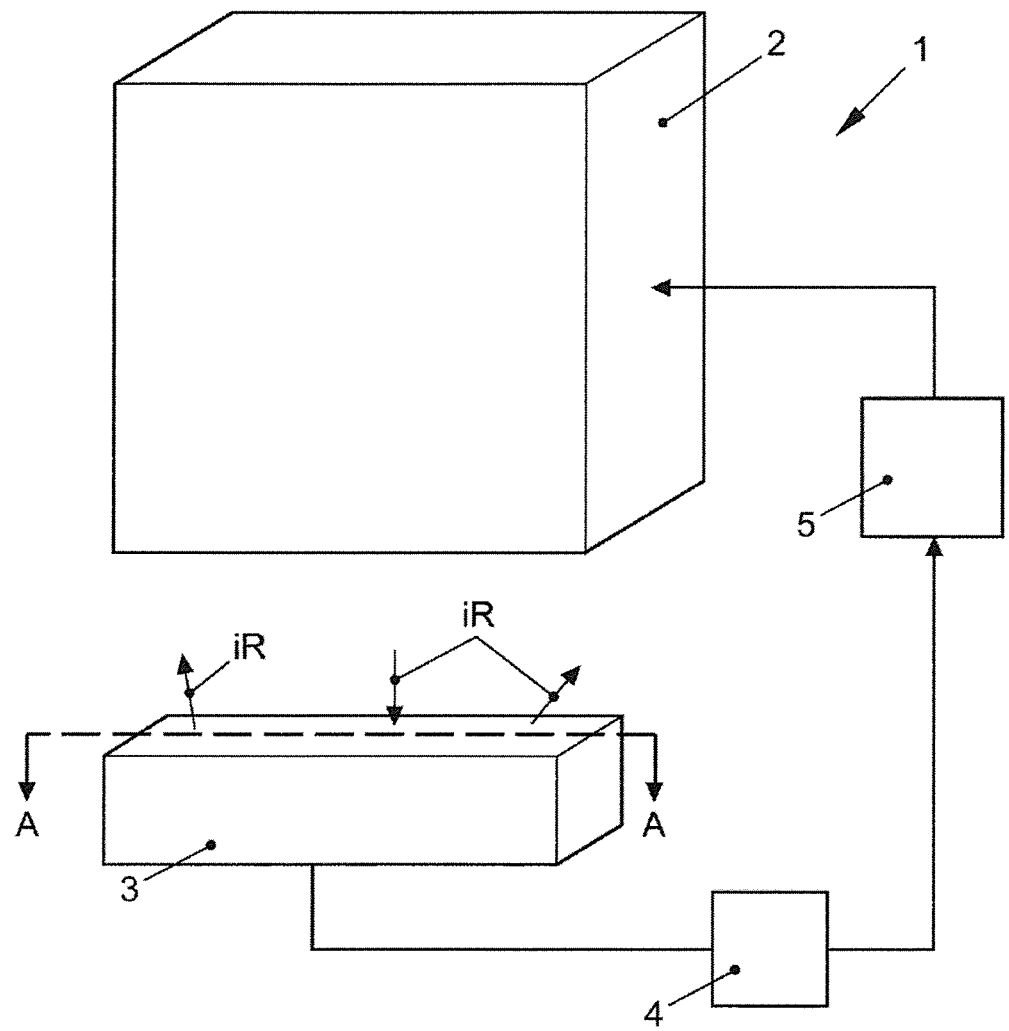
FIG. 1 shows a schematic illustration of a displaying and operating device.

In at least one disclosed embodiment, in the event of a decrease in the reception signal relative to a previously detected static reception signal by a predefined value, the previously detected static value is erased. For example, if a coffee cup put down previously and ignored as a static object is moved away from the proximity sensor system by a predefined amount, such that the reception signal decreases by the predefined value, then the coffee cup is subsequently taken into account again as an object or the reception signal resulting from it is taken into account again. This ensures that the ignoring of reception signals can be reset.

In a further disclosed embodiment, the proximity sensor system monitors exactly one monitoring space. This constitutes a very simple and robust embodiment. In principle, provision can also be made for the proximity sensor system to have a plurality of monitoring spaces separate from one another. Particularly in the case of IR or UV proximity sensor systems, a certain spatial identification of a penetrating object is thus possible.

In a further disclosed embodiment, the proximity sensor system is designed as an IR proximity sensor system.

In a further disclosed embodiment, the proximity sensor system comprises a screen with an optical element, and these can also be designed as an integrated structural unit.

In a further disclosed embodiment, the optical element is designed in such a way that emitted IR radiation is scattered into the monitoring space and received IR radiation is guided to at least one receiving device. Consequently, a large monitoring space can be scanned with a small number of IR transmitting diodes, the signals of which are evaluated with a small number of IR receiving diodes (in the extreme case just a single one).

In a further disclosed embodiment, the proximity sensor system comprises a reference diode, by means of which, for example, thermal alterations of the emission of the IR transmitting diodes can be derived.

In a further disclosed embodiment, a change is made from a displaying representation to an operating representation on the display unit depending on a penetrating object. In this case, on the operating representation, at least one operating panel is represented in a larger manner in comparison with the displaying representation or is actually displayed for the first time.

The displaying and operating device 1 comprises a display unit 2 and a proximity sensor system 3. The display unit 2 is designed as a touchscreen, for example. Furthermore, the displaying and operating device 1 comprises a unit 4 and a control unit 5. The proximity sensor system 3 is designed in such a way that it monitors a monitoring space 14 (see FIG. 2) in front of the display unit 2 for penetrating objects 15 (see FIG. 2) such as, for example, the finger of an operator. For this purpose, the proximity sensor system 3 emits IR radiation and receives IR radiation reflected from objects. The received IR radiation is evaluated in the unit 4 and an evaluation result is communicated to the control unit 5. The control unit 5 then controls the display unit 2, wherein a representation on the display unit 2 is changed or is not changed, depending on the evaluation result.

Figure 2:
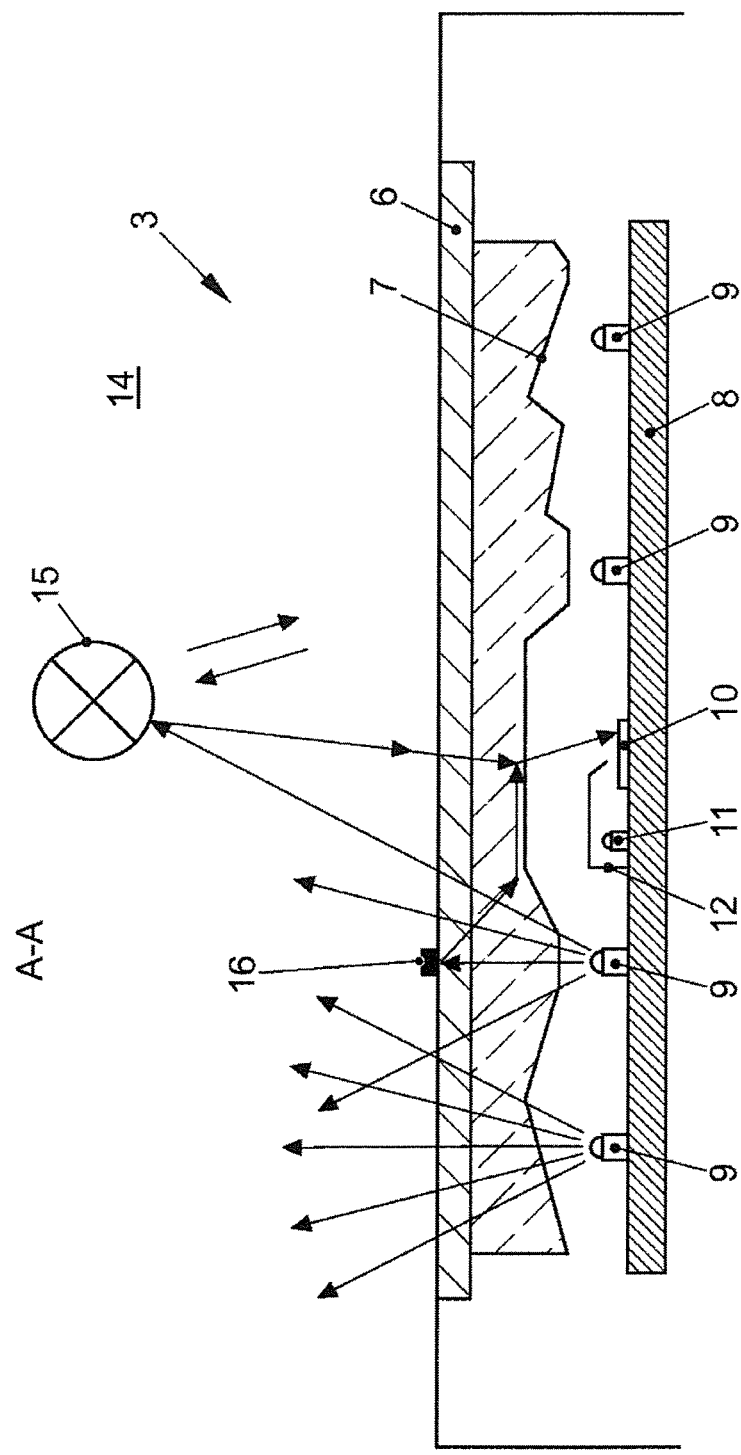
FIG. 2 shows a sectional illustration of a proximity sensor system in a first disclosed embodiment.

The evaluation will now be explained with reference to FIG. 2. The proximity sensor system 3 comprises a screen 6, an optical element 7 and a printed circuit board 8, on which IR transmitting diodes 9, an IR receiving diode 10 and a reference diode 11 with a shield 12 are arranged. In this case, the optical element 7 is designed in such a way that IR radiation emitted by the IR transmitting diodes 9 is scattered. On the other hand, the optical element 7 has the function of an optical waveguide, i.e. of guiding the IR radiation impinging on the optical element 7 via the screen 6 optionally to the receiving diode 10. Illustratively, the IR receiving diode 10 integrates all IR radiation from the monitoring space 14 which is incident on the screen 6 from the monitoring space 14.

Figure 4:
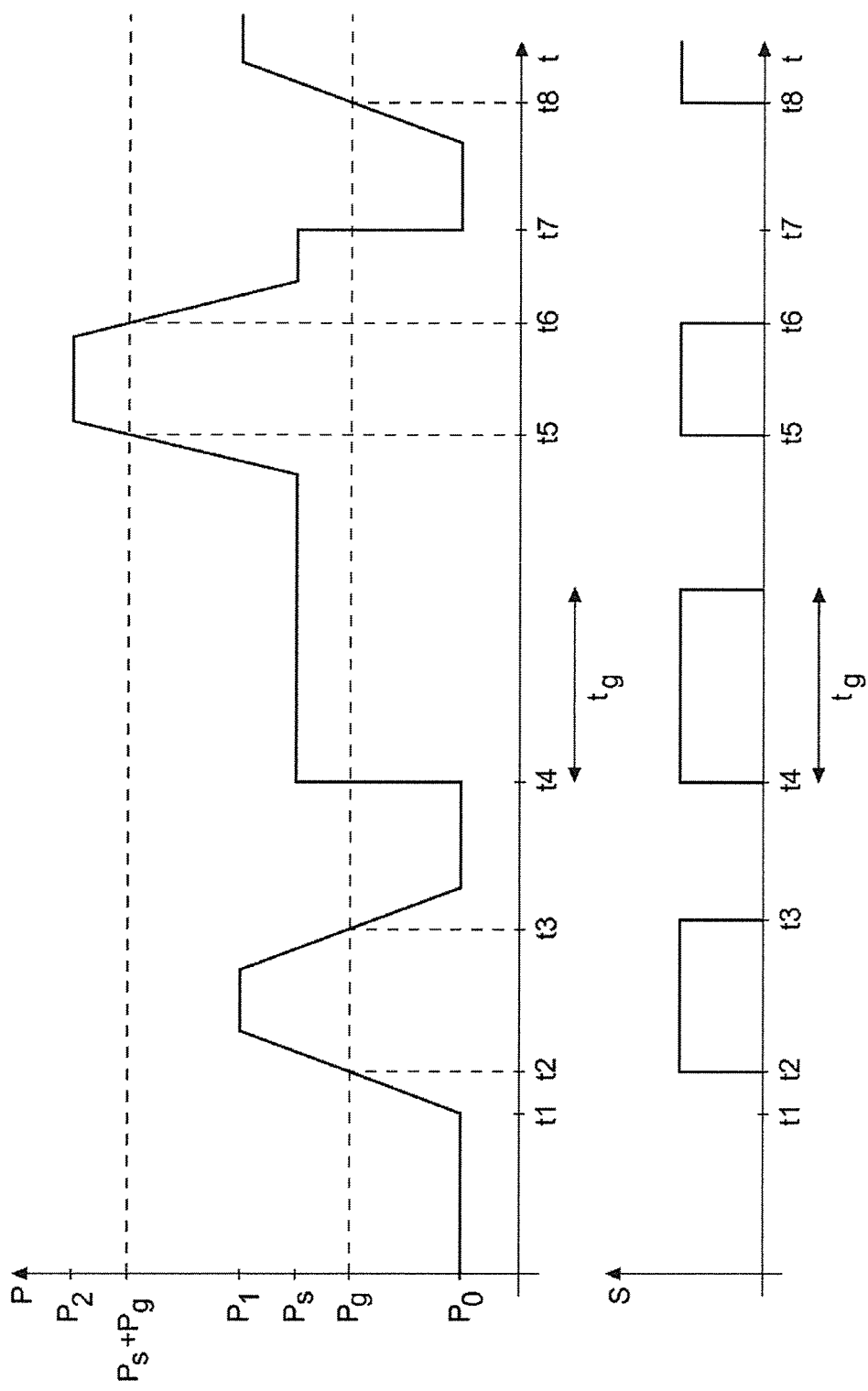
FIG. 4 shows illustrates a level P of the reception signal in lux represented against time t.

The sequence will be explained by way of example with reference to FIG. 4, wherein a level P of the reception signal in lux, for example, is represented against time t.

If it is assumed that initially there is no object 15 situated in the monitoring space 14, then the IR receiving diode 10 receives no IR radiation (disregarding backscatter at the optical element 7 and the screen 6). If an object 15 then moves into the monitoring space 14 at the instant t1, IR radiation is reflected at the object and the received IR radiation at the IR receiving diode 10 increases. If the reception signal P at the IR receiving diode 10 without object 15, for example, was P0, then the reception signal P rises to a level P1. If the reception signal P then exceeds a rise to the level P1 a predefined value Pg at the instant t2, then unit 4 (see FIG. 1) generates a signal S for the control unit 5 that an approaching object 15 has been detected. If the level of the reception signal P falls below the predefined value Pg at the instant t3 on account of the object 15 (for example because a hand as object 15 is withdrawn), then the control signal S is reset. In this case, it should be noted that in the case of this design the IR receiving diode 10 cannot distinguish where and how many objects 15 are in the monitoring space 14. If a dirt particle 16 then reaches the screen 6 at the instant t4, for example, the reflection increases at the dirt particle and the level of the reception signal P at the IR receiving diode 10 rises, i.e. the dirt particle 16 has the same effect as an object penetrating into the monitoring space 14. In this case, it shall be assumed that the level brought about by the dirt particle 16 is Ps. If Ps>Pg, this would result in a corresponding signal S being permanently transmitted to the control unit 5. To prevent this, then, the unit 4 evaluates the temporal sequence of the reception signals P. If the unit 4 then detects a constant level Ps within a predefined time interval Tg of 60 seconds, for example, this constant level Ps is interpreted as originating from a "static object". After the predefined time, the unit 4 then ignores this constant level Ps and the control signal S is reset. This can be carried out, for example, by the constant level Ps being added to the predefined value Pg, such that the unit 4 subsequently generates a control signal for the control unit 5 only if a penetrating object 15 generates a level P2>Pg+Ps at the IR receiving diode 10. The exceeding of the level Pg+Ps at the instant t5 and the falling below Pg+Ps at the instant t6 are illustrated by way of example here. If the dirt particle 16 is removed at the instant t7, then the unit 4 detects this and resets the predefined value to Pg again. Accordingly, the predefined value is reset to Pg again if the previously detected reception signal Ps of the static object is reduced or decreases. In this case, too, the unit 4 evaluates this as the "static object" being moved away and resets the predefined value to Pg. Therefore, a signal S is generated again at the instant t8 upon Pg being exceeded. In the case of the decrease, preference is given here to predefining a value (absolute or relative) by which the level must be reduced to erase Ps again, so that not every variation in the reception signal leads to erasure.

The emission of the IR transmitting diodes 9 is for example also dependent on the ambient temperature. Accordingly, the magnitude of the reception signal of the IR receiving diode 10 is also temperature-dependent. To take account of the different transmission characteristic of the IR transmitting diodes 9, the reference diode 11 is provided. The latter is constructed identically to the IR transmitting diodes 9, such that the transmission characteristic is likewise identical. If the IR transmitting diodes 9 are then driven with PWM signals, for example, the reference diode 11 is driven in the pulse pauses in which reflected radiation from objects is not actually expected any longer. Then the emission characteristic of the IR transmitting diodes 9 can be deduced from the reception signals at the IR receiving diode 10 on the basis of the emission of the reference diode 11 and, for example, the predefined value Pg can be adapted. In this case, the shield 12 prevents IR radiation from the reference diode 11 from being emitted toward the outside.

Figure 3:
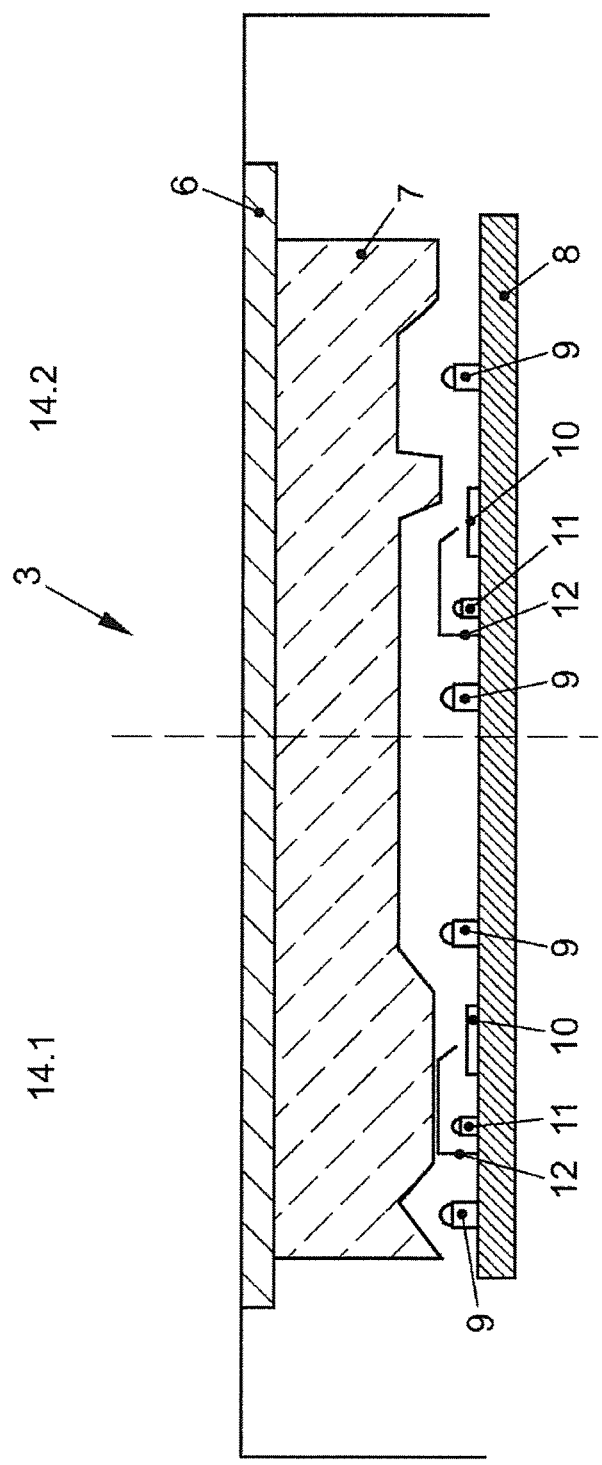
FIG. 3 shows a sectional illustration of a proximity sensor system in a second disclosed embodiment.

FIG. 3 illustrates an alternative embodiment. In this case, elements identical to those in FIG. 2 are provided with identical reference signs. The major difference with respect to FIG. 2 is that the proximity sensor system 3 has two IR receiving diodes 10 with respective reference diode 11, with the result that two monitoring regions 14.1, 14.2 exist. In this case, the method described above can be carried out separately for each monitoring region 14.1, 14.2, such that, for example, a "static object" in the first monitoring region 14.1 has no influence on object detection in the second monitoring region 14.2.

WO 2007/107368 A1 discloses a displaying and operating device, comprising a display unit and a proximity sensor system, wherein penetration of an object into at least one monitoring space can be detected by means of the proximity sensor system, wherein at least one representation on the display unit is altered depending on a penetrating object. The document discloses that when an object is detected, a representation on the display unit is switched over, such that, for example, an operating panel is represented in a magnified manner to simplify subsequent operation. In this case, the triggering condition for the operating function can differ depending on the technology used. In this regard, for example, the display unit can be designed as a touchscreen, such that the operating function is performed in the event of touch contact. Alternatively, the operating function can also be triggered contactlessly, for example such that the operating panel is magnified upon a first approach and is triggered upon a further approach.

The disclosed embodiments address the technical problem of providing a displaying and operating device of the generic type and a method for controlling such a displaying and operating device in which malfunctions are reduced.

The invention claimed is:

1. A displaying and operating device comprising:
a display unit;
at least one proximity sensor system for monitoring at least one monitoring space, wherein penetration of an object into the at least one monitoring space is detected by the at least one proximity sensor system which emits a reception signal indicative of the detected penetration of the object into the at least one monitoring space; and
an evaluation unit configured to evaluate a temporal sequence of reception signals emitted from the at least one proximity sensor system,
wherein, in response to detection of the penetrating object, alteration of at least one representation displayed on the display unit is performed,
wherein the evaluation unit is further configured to detect a reception signal corresponding to a static object in the at least one monitoring space, wherein the detected reception signal corresponding to the static object is a constant value as a result of the non-movement of the static object over a predefined interval of time,
wherein, in response to receipt of the reception signal including the constant value for a predefined time interval, the evaluation unit ignores the constant value of the reception signal as a static reception signal indicative of detection of a static object, and stores the constant value of detected reception signal associated with the static object as a threshold value to be compared with subsequently emitted reception signals,
wherein, thereafter, the at least one representation displayed on the display unit is changed only in response to determination by the evaluation unit that detection of a reception signal subsequently emitted by the at least one proximity sensor system exceeds the stored constant threshold value by a predefined value,
and
wherein subsequent to the storage of the stored constant threshold value, the evaluation unit is further configured to erase the stored constant threshold value in response to the evaluation unit detecting a reception signal emitted by the at least one proximity sensor system with a value that is less than the stored constant threshold value.

2. The displaying and operating device of claim 1, wherein the at least one proximity sensor system monitors exactly one monitoring space.

3. The displaying and operating device of claim 1, wherein the at least one proximity sensor system is an IR proximity sensor system.

4. The displaying and operating device of claim 3, wherein the optical element scatters emitted IR radiation into the at least one monitoring space and guides received IR radiation to at least one receiving device.

5. The displaying and operating device of claim 3, wherein the at least one proximity sensor system comprises at least one reference diode.

6. The displaying and operating device of claim 1, wherein the at least one proximity sensor system comprises a screen with an optical element.

7. The displaying and operating device of claim 1, wherein the displaying and operating device is configured so that a change is made from a displaying representation to an operating representation on the display unit depending on a detected presence of the penetrating object.

8. The displaying and operating device of claim 1, wherein a magnitude of the reception signals emitted from the at least one proximity sensor system is temperature-dependent.

9. A method for controlling a displaying and operating device that includes a display unit and at least one proximity sensor system, the method comprising:
  detecting penetration of an object into at least one monitoring space monitored by the at least one proximity sensor system, and in response, emitting a reception signal indicative of the detected penetration of the object into the at least one monitoring space;
  altering at least one representation on the display unit in response to the emitted reception signal indicating the detected presence of the penetrating object;
  evaluating, with a unit, a temporal sequence of reception signals emitted from the at least one proximity sensor system;
  detecting, with the evaluation unit, a reception signal corresponding to a static object in the at least one monitoring space, wherein the detected reception signal corresponding to the detected static object is a static reception signal of constant value received over a predefined interval of time as a result of non-movement of the static object, wherein the evaluation unit stores the constant value of the detected reception signal as a threshold value to be compared with subsequently emitted reception signals;
  subsequent to the storing of the constant threshold value, ignoring the constant value of the reception signal as a static reception signal indicative of detection of a static object and also carrying out a change in the at least one representation on the display unit only in response to subsequent emission of a reception signal exceeding the stored constant threshold value of the reception signal by a predefined value,
  wherein, subsequent to the storage of the stored constant threshold value, the evaluation unit is further configured to erase the stored constant threshold value in response to the evaluation unit detecting a reception signal emitted by the at least one proximity sensor system with a value that is less than the stored constant threshold value.

10. The method of claim 9, wherein the at least one proximity sensor system monitors exactly one monitoring space.

11. The method of claim 9, wherein the at least one proximity sensor system is an IR proximity sensor system comprising a screen with an optical element, wherein the optical element, scatters emitted IR radiation into the at least one monitoring space and guides received IR radiation to at least one receiving device.

12. The method of claim 11, wherein the at least one proximity sensor system comprises IR transmitting diodes, at least one IR receiving diode and a reference diode, wherein the emission characteristic of the IR transmitting diodes is deduced from the reception signals at the IR receiving diode based on the emission of the reference diode.

13. The method of claim 9, wherein a change is made from a displaying representation to an operating representation on the display unit depending on a detected presence of the penetrating object.

14. The method of claim 9, wherein a magnitude of the reception signals emitted from the at least one proximity sensor system is temperature-dependent.

* * * * *